PHONOGRAPH SPINDLE ADAPTER

Filed July 11, 1952 2 Sheets-Sheet 1

INVENTOR.
James E. Vistain Jr.
BY J. D. Douglas
His Att'y.

June 18, 1963 J. E. VISTAIN, JR 3,094,332

PHONOGRAPH SPINDLE ADAPTER

Filed July 11, 1952 2 Sheets-Sheet 2

INVENTOR.
James E. Vistain Jr.
BY
J. W. Douglass
His Att'y.

3,094,332

PHONOGRAPH SPINDLE ADAPTER

James E. Vistain, Jr., Chicago, Ill., assignor to Admiral Corporation, Chicago, Ill., a corporation of Delaware Filed July 11, 1952, Ser. No. 298,225
1 Claim. (Cl. 274—10)

This invention relates to new and useful improvements in phonograph record player mechanism and more particularly to an adapter which may be slid down over a shouldered spindle of a record player, which provides magazine support for small center hole records, so that magazine support may be then afforded for large center hole records.

Among the improvements which are incorporated in the present invention are those which afford convenience of repair or adjustments of the same and which provide for economy of manufacture.

Other advantages of the invention will be set forth in part hereinafter and in part will be obvious herefrom, or may be learned by practice with the invention, the same being realized and attained by means of the instrumentalities and combinations pointed out in the appended claim.

The accompanying drawings, referred to herein and constituting a part hereof, illustrate one embodiment of the invention and together with the description, serve to explain the principles of the invention.

Figures 1, 2:
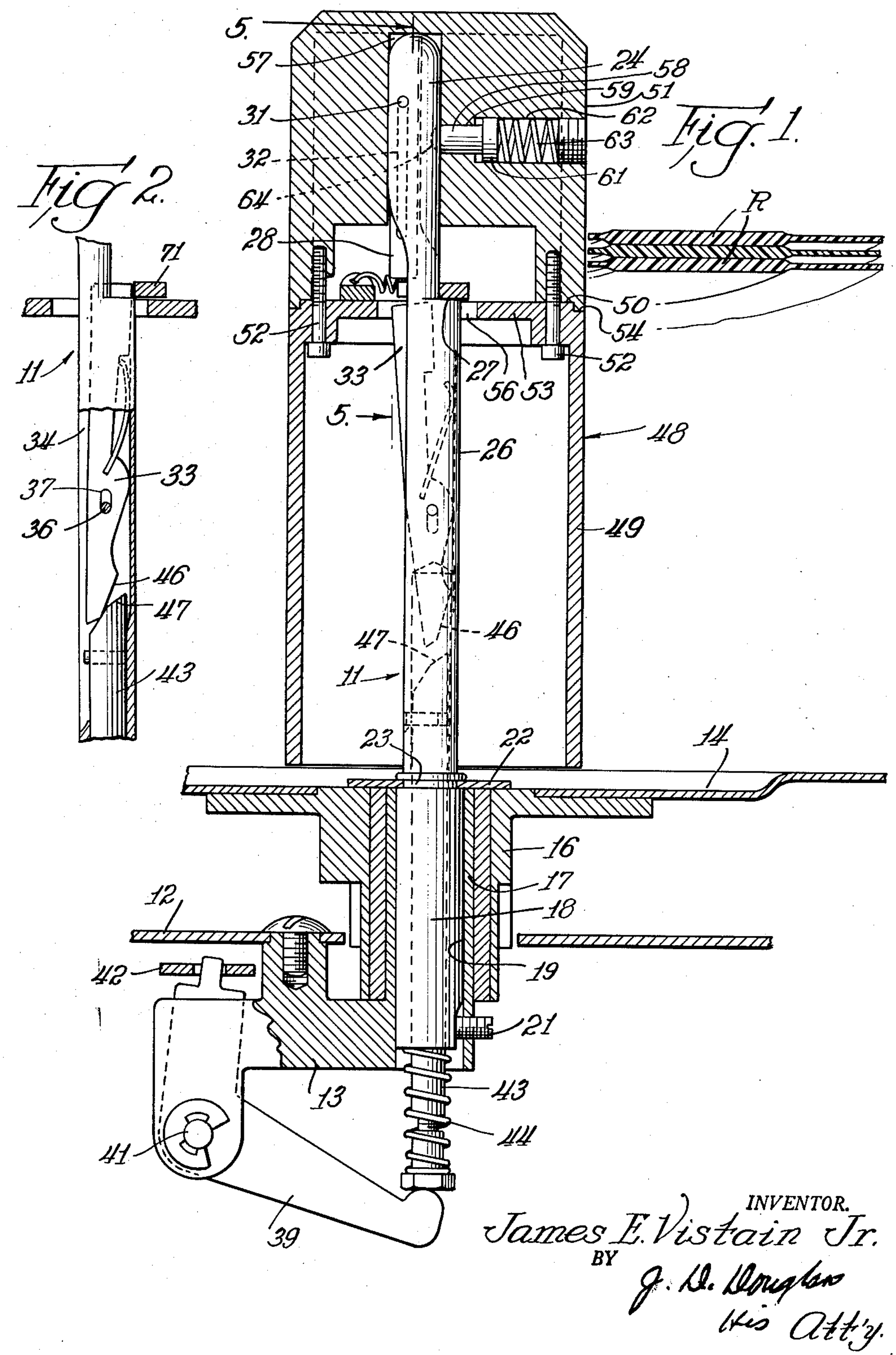
FIG. 1 is a fragmentary sectional view of the invention as applied to a record player, parts being broken away to reveal the structure of underlying parts.
FIG. 2 is a fragmentary view of the spindle shown in FIG. 1, in elevation, but having a portion thereof broken away.

In the drawings, the reference character 11 is used to denote, in its entirety, a phonograph automatic record player spindle as referred to in my copending applications, Ser. No. 418,493 filed March 20, 1951 and now Patent No. 2,720,988, and Ser. No. 255,344 filed November 8, 1951 and now Patent No. 2,989,312, in detail. Consequently, the structural features of the spindle will be described herein only as a setting for the invention. Briefly, the spindle 11 is supported from a base plate 12 by a bearing 13, also affording support for a turntable 14 rotatable about the spindle. Further, for its support, the turntable has a hub 16 which is journaled on a vertical trunnion 17 forming an integral part of the bearing 13. The spindle 11 comprises a base portion 18 received in a bore 19, axially of the trunnion, within which the spindle is locked against displacement thereof by a set screw 21. The lower end of the turntable hub 16 rests on the bearing 13 from which it is locked against substantial displacement in an upward direction by a fastener 22 pinched in an annular recess 23 in the spindle portion 18 just above the trunnion 17.

The spindle, above the base portion 18 thereof, is of diameter capable of passing freely through the center hole of a small center hole record; that is, a record of the class having center holes which are to be found in 78 r.p.m. records of the coarse groove type. At the top, the spindle 11 includes a pilot portion 24 which is in offset relation to the base 18 and a guide or intermediate portion 26. A stack of the small center hole records, when threaded over the pilot 24, rests on a shoulder 27 at the top of the guide portion 26. The shoulder 27 is at a level spaced by slightly more than the thickness of a record from the lower end of a slider 28 when it is in a normal position of suspension in a kerf 29 from a pin 31, passing through the pilot 24 and a slot 32 in the slider, so that records above the bottom record, on the shoulder 27, are restrained from edgewise displacement and so that played records may be removed from the turntable by sliding them upward, the operation of which causes the lower portion of the slider to recede into the spindle.

The lowermost record of a stack on the shoulder 27 may be dislodged therefrom by an ejector member 33. The ejector is supported within a slot 34 in the guide portion 26 wherein it is floatingly anchored by a pin 36 in the spindle which extends through a slot 37 in the ejector. During record playing, the ejector 33 occupies a normal position as shown in FIG. 1 by gravity, and the force of a leaf spring 38 which said ejector carries and so is free from the shoulder 27. When, however, the record player operates cyclically, a lever 39, pivoted at 41 to the bearing 13, is rocked by a link 42 to press a rod 43, slidably journalled in the guide 26 and base 18, upward against the resistance of a spring 44 which biases the rod downward. Normally, the rod is disengaged from the ejector 33 as shown in FIG. 1. When, however, the rod is thus moved upward from its normal position, it engages the ejector 33 which is first moved upward into the center hole of the bottom record on the shoulder 27 and then swung clockwise about pin 36, after traveling the length of the slot 37 as depicted in FIG. 2, the rotary motion accompanying cooperation between a cam 46 on the ejector and a cam 47 on the rod 43. The clockwise rocking motion of the ejector is adequate to dislodge the bottom record from the support of shoulder 27 so that said record drops to the turntable 14 guided thereto by the guide 26.

Although the apparatus thus far referred to forms no part of the present invention per se, it has been described briefly since successive release of large center hole records from their magazine support, about to be described, is carried out consequent to motion of the ejector 33.

The means by which is stack of the large center hole records is afforded magazine support consists of an adapter comprising a cylindrical housing, shell or composite barrel 48 of diameter only sufficiently less than the center hole of a large center hole record to pass freely therethrough. In detail, the housing comprises a lower barrel portion 49 which is capped by an upper barrel portion 51 secured to the portion 49 by screws 52. At its upper end, the portion 49 is substantially closed by a chassis portion or head 53 which is recessed about the edge at 54 so that said head may have complementary cooperation with a counterbore 50 at the lower edge of the cap 51. The head 53 has an elongated opening 56 through which the spindle may freely pass into a socket provided by a bore 57 eccentric of the axis of the adapter to receive the pilot 24.

Retention means is provided for releasably retaining the adapter in operative association with the spindle. It comprises a button 58 slidably disposed in a bore 59 which is normal to the bore 57. Additionally, the button 58 includes a portion 61, of enlarged diameter, within a counterbore 62 while a compression spring 63 also within the counterbore, urges the button 58 into the socket 57 for a sufficient distance to operatively engage a conical seat 64 on the side of the pilot 24. The assembly is held in place by a threaded screw.

In the process of installing the adapter on the spindle, the rounded upper extremity of the pilot 24 cams the button to the right (FIG. 1) against spring 63 until the seat 64 is at the level of the button which thereupon is shaped into engagement with the seat by the spring. The adapter then is retained against displacement angularly and axially with respect to the spindle. While so retained, the lower extremity of the barrel portion 49 is spaced from the level of the record supporting surface of turntable 14 by less than the thickness of a record, so that as records accumulate on the turntable they are centered with respect to said turntable by the adapter. Additionally, when the adapter is so supported by the spindle 11, the top surface of the head 53 is flush with the shoulder 27 for a reason to become apparent hereinafter.

The adapter may be readily removed from the spindle by pulling it upward in which operation the conical surfaces, defining the seat 64 cam the button to the right and the pilot so retains the button until it is disengaged therefrom.

If desirable, an apertured partition or web, not shown, may be provided at the lower end of the barrel 49 for engagement with the spindle 26 to assist in maintaining alignment thereof.

A stack of the large center hole records R is indicated in FIG. 1. It is supported by novel mechanism best shown in FIGS. 3 to 6 inclusive. The mechanism comprises a bell crank lever or lower record support 66 pivoted at 67 to the head 53, a slicer lever or upper record support 68, pivoted at 69 to the head 53 and an operating arm or follower carrier 71 pivoted at 72 also to the head 53. The arm 71 and one end of lever 66 are coupled to each other by a tension spring 73 which serves to bias the arm 71 into intimate association with the pilot on the side thereof immediately above the shoulder 27. Also, the spring 73 biases lever 66, clockwise about its axis so that a record supporting portion 74 thereon is normally extended through an aperture or notch 76 in the upper barrel portion 51. Although the upper record support 68 is pivoted at such an elevation that it is superimposed on the lever 66, the upper horizontal surface of the supporting portion 74 of said lever is at such an elevation with respect to the blade 68 that when swung about its pivot 69 the support 68 would be extended between the bottom record of the stack R and the record thereof immediately overlying the bottom record.

Figure 3:
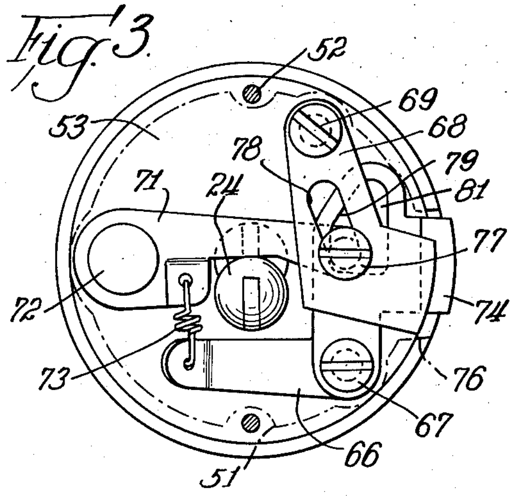
FIGS. 3 and 4 are top enlarged plan views of the lower portion of the adapter, the mechanism in both views being shown in different positions.
Figure 4:
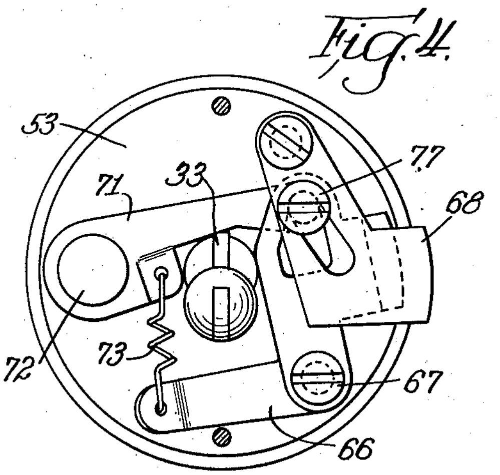
Figure 7:
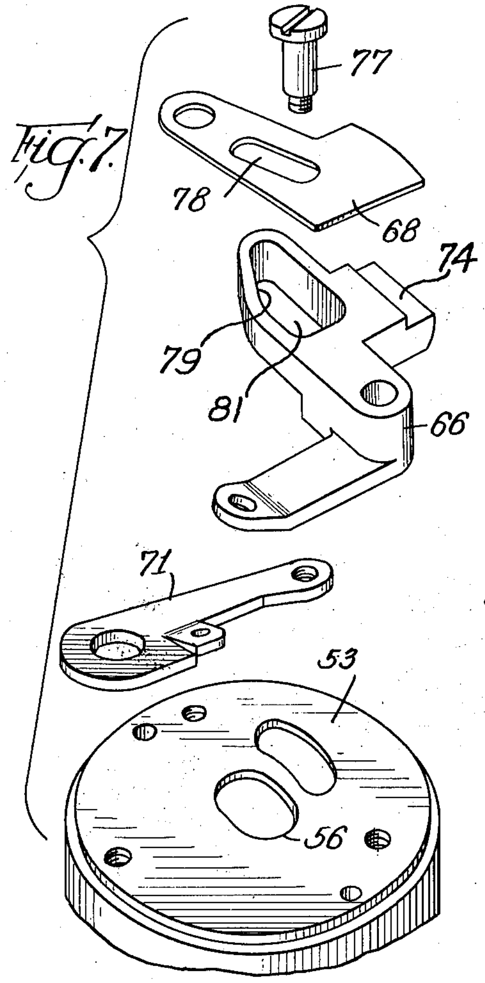
FIG. 7 is an exploded view of the movable parts of the adapter and head of the lower barrel portion, in perspective.
Figure 5:
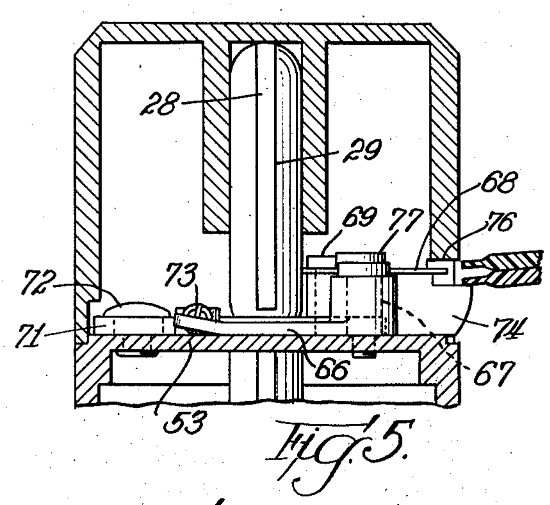
FIG. 5 is a fragmentary section taken on line 5—5 of FIG. 1.
Figure 6:
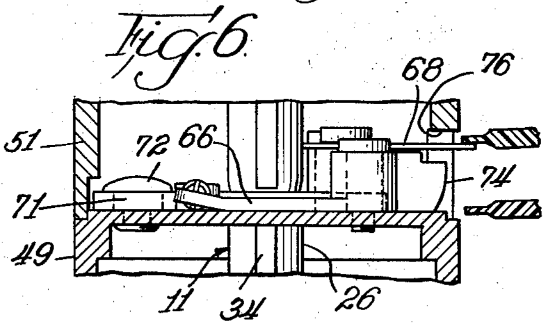
FIG. 6 is a view corresponding to FIG. 5, the movable parts thereof being shown in a different position.

The upper and lower supports 66 and 68 are operated against the resistance of the spring 73 from the ejector 33. In order that this may be carried out the follower carrier 71 bears a follower 77, at its swinging end, which has concurrent engagement with a positive motion cam provided by the edges of a slot 78 in the lever 68 and a lost motion cam 79 at one side of an aperture 81 in the lever 66. While at one end of the slot 78, as depicted in FIG. 3, the follower retains the upper support within the periphery of the adapter as the spring retains the lower support 66 extended through the aperture 76 to an extent limited by engagement of the follower with cam 79 which extension is, as has been indicated, beyond the periphery of the barrel 48. And this is the normal positions of the record supports when the ejector 33 is within the spindle as indicated in FIG. 1. In moving to its other extreme position (FIG. 2) the ejector 33 carries the carrier 71 before it by swinging said carrier about its pivot 72 while the follower 77 is concurrently carried to the opposite end of the slot 78. In this connection it should be noted that from the time its motion is initiated, the follower moves the upper support 68, owing to the direction slot 78 extends with respect to the course of the follower. It should also be noted that for a substantial fraction of its initial motion the follower 77 does not encounter a rise in the portion of the cam 79. The purpose of these constructional features of the cams are to provide for extension of the blade 68 between the bottom record of the stack R and the records thereabove before the support 74 is withdrawn within the periphery of the shell 48 and consequent release of the bottom record to the turntable is effected.

Although the invention has been described in one embodiment thereof, I am aware that numerous and extensive departures may be made therefrom without departing from the spirit or scope of my invention.

I claim:

The combination with a record player spindle small enough diametrically to extend through the center hole of a small center hole record and having a shoulder upwardly thereof above which is a pilot portion in offset relation to the portion below the shoulder and having an ejector within the spindle for movement outward thereof at the shoulder to release a record therefrom, one of the spindle portions being formed with a retention seat thereon, of an adapter comprising upper and lower barrel members rigidly coupled in coaxial relation to each other to provide a composite casing of uniform diameter and sufficiently smaller diametrically than the center hole of a large center hole record to pass freely therethrough, a first socket within one of the members formed to receive the spindle in a predetermined position with respect to the adapter when said adapter is slid down over said spindle into operative association therewith, a second socket normal to and communicating with the first socket at a point beside the spindle seat when the adapter is operatively associated with said spindle, a spring pressed latch member in the second socket to releasably retain the adapter on the spindle by its being pressed against the seat, the upper barrel member also having an aperture at one side thereof communicating with the interior of said member and being adjacent the spindle shoulder when the adapter is operatively associated with the spindle, upper and lower record supports mounted within one of the members, a linkage operated by the ejector when it is moved out of the spindle to communicate motion to the supports and for moving them concurrently in opposite directions and for support of the records above the bottom record by the upper support by its extension therebetween before said lower support is retracted to release the bottom record for passage to a turntable at the bottom of the adapter, and means coupled between said linkage and said lower support whereby said lower support is normally extended outward beyond the periphery of said adapter to support a stack of large center hole records threaded over said adapter, and said upper support is normally held with said adapter.

References Cited in the file of this patent

UNITED STATES PATENTS

| | | |
|---|---|---|
| 1,568,130 | Blackwell | Jan. 5, 1926 |
| 2,302,503 | Proctor | Nov. 17, 1942 |
| 2,490,678 | Dale | Dec. 6, 1949 |
| 2,517,630 | Carson | Aug. 8, 1950 |
| 2,523,045 | Miller et al. | Sept. 19, 1950 |
| 2,549,246 | Schweitzer | Apr. 17, 1951 |
| 2,561,792 | Emde | July 24, 1951 |
| 2,666,647 | Dale | Jan. 19, 1954 |
| 2,666,648 | Dale | Jan. 19, 1954 |
| 2,683,039 | Fortune | July 6, 1954 |